July 3, 1928.  1,675,495

F. KADE

PROTECTIVE DEVICE FOR COMPENSATED ASYNCHRONOUS MOTORS

Filed March 11, 1925

Inventor:
Friedrich Kade.

Patented July 3, 1928.

1,675,495

UNITED STATES PATENT OFFICE.

FRIEDRICH KADE, OF KIEL, GERMANY, ASSIGNOR TO DEUTSCHE WERKE KIEL, AKTIENGESELLSCHAFT, OF KIEL, GERMANY, A CORPORATION OF GERMANY.

PROTECTIVE DEVICE FOR COMPENSATED ASYNCHRONOUS MOTORS.

Application filed March 11, 1925, Serial No. 14,753, and in Germany March 12, 1924.

The invention concerns a protective device for compensated asynchronous motors, which shall prevent the motor being started when the brushes are incorrectly placed in regard to their connection between the motor and mains. Compensated asynchronous motors, that is to say, motors which in normal action take no idle power from the mains, have in general a definite brush position for either direction of rotation. If it is desired to alter the direction of rotation of such a motor, not only must the direction of the rotating field be reversed, as with other motors, by exchanging two of the leads, but also it is important that the brush rocker be brought into the precise position corresponding to this running direction. If this is not carried out the motor operates with a power factor considerably less than 1, and the object of the special design of this machine is thereby defeated.

It is thus possible that due to carelessness the proper positioning of the brushes may be omitted, and in order to obviate all risk of this, according to the invention, the motor is provided with a protective device whereby the motor can only be set in operation if the brush rocker is in the correct position corresponding to the direction of rotation in question at the moment.

Figure 1:
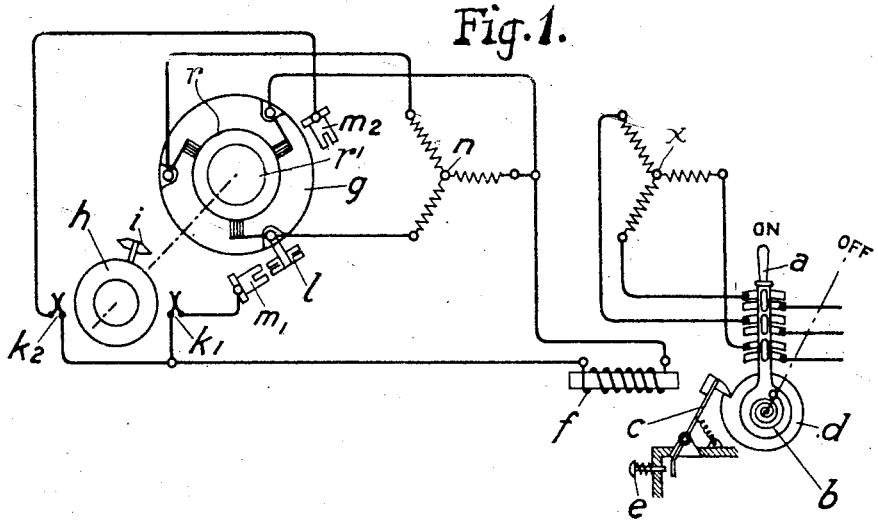
Figure 3:
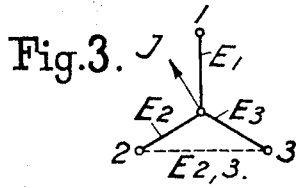
Figure 2:
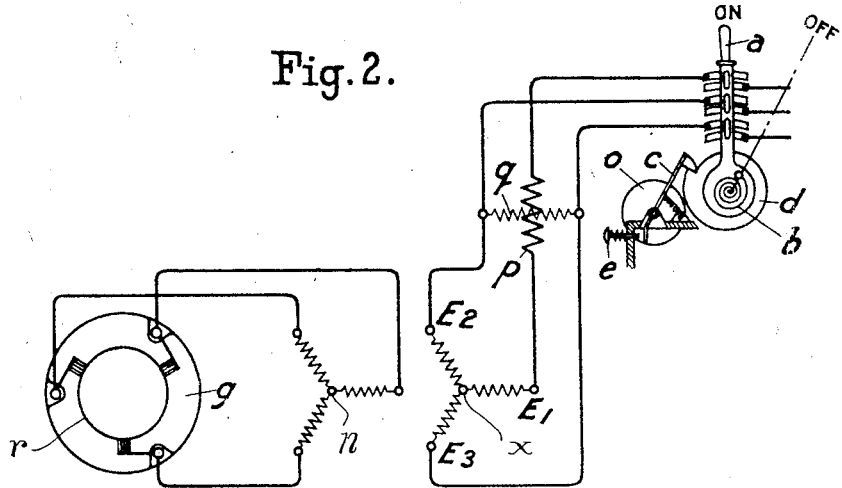

The accompanying drawing illustrates two examples of the subject of the invention carried into practice whereof:

Figure 1 shows diagrammatically one method of control employing an electromagnetic device; Fig. 2 shows a method utilizing the properties of alternating and induced currents, and Fig. 3 is an explanatory diagram referring to Fig. 2.

In the drawings compensated asynchronous motors are depicted in Figs. 1 and 2 wherein $x$ indicates the main stator winding, $n$ the stator auxiliary or exciting winding, and $r$ the commutator winding carried on the rotor. There is generally also, as is well known, a completely closed rotor winding $r_1$ for the working current, but this has nothing particularly to do with the present invention.

Referring to Fig. 1, a switch $a$ is mounted on the motor for example, which is to effect the switching in of the motor in the correct sequence. A tension spring $b$ tends to bring the switch into "cut out" position, being prevented from doing so however by a pivotal catch $c$ which engages a notched disk $d$ connected with the switch $a$ and which can be released for the purpose of switching off the motor by pressure of a spring controlled plunger $e$.

According to the example illustrated in Fig. 1 the catch $c$ is also under the control of an electro-magnet $f$ which is energized immediately the brush rocker $g$ does not happen to be in its correct position. The protective device is made directly dependent upon the direction of rotation, for example, by arranging a ring $h$ on the shaft (the axis of which is indicated by dot-dash lines) so as to be rotated therewith by friction and according to the direction of rotation to break one or other of the contacts $k_1$, $k_2$ by means of the double wedge-shaped plug $i$ of insulating material.

If, for example, for clockwise rotation in the example shown in Fig. 1 the position of the brush ring whereby the switch $l$ is closed upon contact $m_1$, is correct, the insulating plug $i$ breaks the contact $k_1$, so that no current flows in the relay $f$, and consequently upon letting go the handle of switch $a$, which is held firmly while the motor is being started up, same is retained in its position by the catch $c$. If however, the switch $l$ is wrongly positioned i. e. it lies in contact with contact $m_2$, the rupture of contact $k_1$ by plug $i$ has no effect since the circuit of the relay $f$ is closed over contact $k_2$. Conversely for anti-clockwise rotation the motor switch $l$ should always make contact with contact $m_2$, and then contact $k_2$ is broken by the plug $i$ upon starting the motor. If the switch $l$ now has an incorrect position however, i. e. it lies in contact with contact $m_1$ the relay $f$ is supplied with current over contact $k_1$, and the switch $a$, automatically returns to its inoperative position immediately the attendant releases his hold of it.

It is important that the circuit of the relay be not established directly from the mains, but from the auxiliary circuit $n$ existing on the motor, in order to prevent the danger of an earth contact, especially as the auxiliary circuit voltage is very much lower than the pressure across the mains.

In the example shown in Fig. 2 a metal disk $o$ is connected with the pivotal catch $e$ and is under the control of two coils $p$ and $q$. The one ($p$) is subject to the current J of one phase, the others to the tension between the two phases $E_2$, $E_3$. So long as the current has no phase distortion relative to its phase voltage $E_1$, it remains perpendicular to the voltage $E_2-E_3$, and also with this voltage no torque is generated, as can readily be appreciated by reference to Fig. 3. If, however, the current J possesses phase displacement relative to $E_1$, then a turning moment is produced by a wattless component together with the voltage $E_2-E_3$, which by turning the disk $o$ effects the release of the catch $c$ and thereby the switching off of the motor as described above.

I claim:

1. In a compensated asynchronous electric motor, the combination with brushes, adapted to be displaced by hand in accordance with the direction of rotation of the motor, of a switching member controlling the connections of the motor with the mains, and means adapted to automatically operate said switching member to break the connections of said motor with its external circuit when the brushes are not in the correct position corresponding to the direction of rotation of the motor at the time the motor circuit is closed by said switching member.

2. In a compensated asynchronous electric motor, the combination with brushes, adapted to be displaced by hand in accordance with the direction of rotation of the motor, of a movable brush-rocker, a switching member controlling the connections of the motor with the mains, and means controlled by said brush-rocker and adapted to operate said switching member to break the connections of said motor with its external circuit when the brushes are not in the correct position corresponding to the direction of rotation of the motor at the time the motor circuit is closed by said switching member.

3. In a compensated asynchronous electric motor, the combination with brushes, of a brush-rocker adapted to be displaced by hand in accordance with the direction of rotation of the motor, switching means controlling the connections of the motor with the mains, means adapted to lock said switching means in its circuit-closing position, and means controlled by said brush-rocker and adapted to release said locking means, said releasing means being uneffective when said brush-rocker is in proper position in accordance with the direction of rotation of the motor.

4. In a compensated asynchronous motor, the combination with brushes, adapted to be displaced by hand in accordance with the direction of rotation of the motor, a switching member controlling the connections of said motor with the mains, and electro-magnetic means adapted to operate said switching member to break the connections of said motor with its external circuit when the brushes are not in the correct position corresponding to the direction of rotation of the motor at the time the motor circuit is closed by said switching member.

5. In a compensated asynchronous motor, with brushes adapted to be displaced by hand in accordance with the direction of rotation of the motor, of a movable brush-rocker, a switching member controlling the connections of said motor with the mains, and electromagnetic means controlled by said brush-rocker adapted to operate said switching member to break the connections of said motor with its external circuit when the brushes are not in the correct position corresponding to the direction of rotation of the motor at the time the motor circuit is closed by said switching member.

FRIEDRICH KADE.